United States Patent
Coderre et al.

(12) 
(10) Patent No.: US 6,325,515 B1
(45) Date of Patent: Dec. 4, 2001

(54) CUBE CORNER RETROREFLECTIVE ARTICLE WITH ENHANCED PIGMENTATION

(75) Inventors: James C. Coderre, Lake Elmo; Dennis J. Chirhart, West St. Paul; John W. Frank, Cottage Grove; Stephen A. Johnson; Daniel J. McGurran, both of Woodbury, all of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/548,894

(22) Filed: Apr. 13, 2000

Related U.S. Application Data

(63) Continuation-in-part of application No. 29/120,546, filed on Mar. 21, 2000, which is a continuation-in-part of application No. 29/120,439, filed on Mar. 21, 2000.

(51) Int. Cl.[7] ................................................. G02B 5/124
(52) U.S. Cl. .......................... 359/530; 359/529; 359/900; 264/1.9; 428/30; 428/167; 428/168; 428/172
(58) Field of Search ...................... 359/529–530, 359/534–542, 546, 900; 264/1.9; 428/30, 141–142, 144, 167, 168, 172

(56) References Cited

U.S. PATENT DOCUMENTS

| | | | |
|---|---|---|---|
| D. 383,312 | 9/1997 | Nestegard et al. | D5/61 |
| D. 397,555 | 9/1998 | Nestegard et al. | D5/99 |
| 4,588,258 | 5/1986 | Hoopman . | |
| 4,726,706 | 2/1988 | Attar | 404/14 |
| 5,066,098 | 11/1991 | Kult et al. | 359/540 |
| 5,122,902 | 6/1992 | Benson | 359/529 |
| 5,171,624 | 12/1992 | Walter | 428/156 |
| 5,213,872 | 5/1993 | Pricone et al. | 428/195 |
| 5,229,882 | 7/1993 | Rowland | 359/530 |
| 5,264,063 | 11/1993 | Martin | 156/247 |
| 5,272,562 | 12/1993 | Coderre | 359/529 |
| 5,340,231 | 8/1994 | Steere et al. | 404/14 |
| 5,648,145 | 7/1997 | Martin | 428/156 |
| 5,706,132 | 1/1998 | Nestegard et al. | 359/529 |
| 5,754,338 | 5/1998 | Wilson et al. | 359/530 |
| 5,763,049 | 6/1998 | Frey et al. | 428/172 |
| 5,780,140 | 7/1998 | Nilsen | 428/172 |
| 5,840,406 | 11/1998 | Nilsen | 428/156 |
| 5,940,212 | 8/1999 | Johnson et al. | 359/529 |
| 5,959,774 | 9/1999 | Benson et al. | 359/520 |
| 5,981,032 | 11/1999 | Smith et al. | 428/167 |

FOREIGN PATENT DOCUMENTS

WO 99/37470   7/1999   (WO) .......................... B29D/11/00

*Primary Examiner*—James Phan
(74) *Attorney, Agent, or Firm*—Rudolph P. Hofmann, Jr.

(57) ABSTRACT

Retroreflective sheeting includes a transparent film, a pigmented layer having pigmented indicia thereon, and a retroreflective cube layer. The cube layer includes a number of cube corner elements bounded by at least two sets of intersecting grooves. A metallic film is disposed on at least some of the cube corner elements. The pigmented layer is interposed between the transparent film and the cube layer, and has pigmented indicia aligned with at least one of the sets of intersecting grooves.

35 Claims, 4 Drawing Sheets

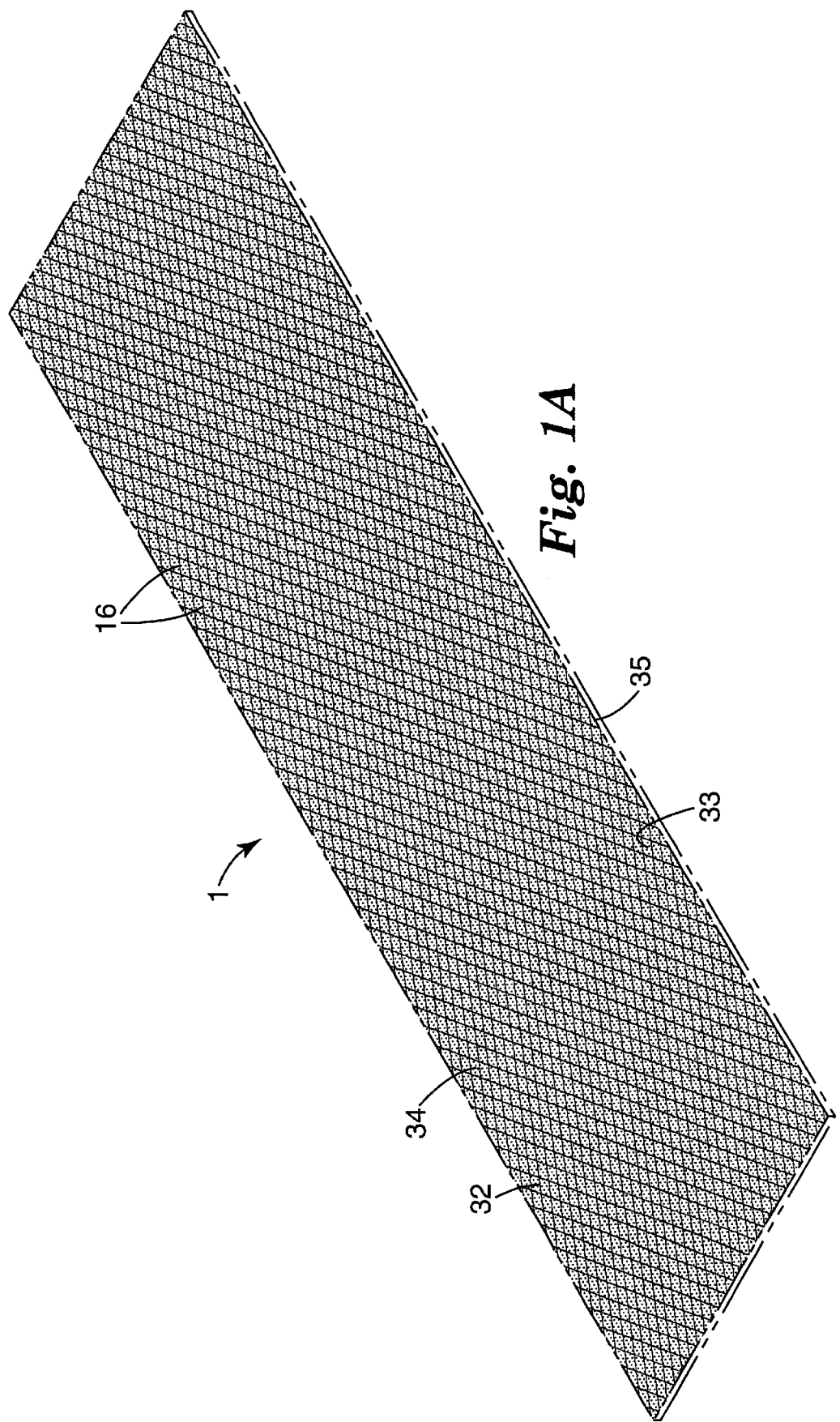

US 6,325,515 B1

CUBE CORNER RETROREFLECTIVE ARTICLE WITH ENHANCED PIGMENTATION

RELATED APPLICATIONS

This application is a continuation-in-part application and claims priority to two co-pending, co-assigned design cases filed Mar. 21, 2000 entitled "Retroreflective Sheeting with Diffuse Markings", U.S. Ser. No. 29/120,439, and "Multiple Orientation Retroreflective Sheeting with Diffuse Markings", U.S. Ser. No. 29/120,546.

BACKGROUND

The present invention relates generally to reflective articles. The invention has particular application to retroreflective sheeting with a multiplicity of cube corner elements.

Retroreflective materials are configured to receive light rays impinging upon a viewing surface and so alter the rays that they are reflected back toward their sources. Retroreflective material is generally used to enhance low-light visibility of articles to which the retroreflective material is attached. Such material is used in a variety of applications ranging from traffic signs to bicycle reflectors. By enhancing low-light visibility, retroreflective materials enhance safety, provide decoration, and increase conspicuity in general.

Two known types of retroreflective material include microsphere-based sheeting and cube corner sheeting. Microsphere-based sheeting, sometimes referred to as "beaded" sheeting, employs a multitude of microspheres typically at least partially imbedded in a binder layer and having associated specular or diffuse reflecting materials (e.g., pigment particles, metal flakes, vapor coats) to retroreflect incident light. In general, however, such sheeting has a lower retroreflective efficiency than cube corner sheeting.

Cube corner retroreflective sheeting comprises a body portion typically having a substantially planar viewing surface and a structured surface comprising a plurality of cube corner elements. Each cube corner element comprises three approximately mutually perpendicular optical faces that intersect at a cube apex or, where the cube apex is truncated, that otherwise converge at an uppermost portion. It is known to treat the structured surface with a specularly reflective coating to improve performance at high entrance angles. An example of this is vapor-coated retroreflective sheeting.

Cube corner sheeting typically has a much higher retroreflectance than beaded sheeting, where retroreflectance is expressed in units of candelas per lux per square meter. However, certain graphics applications require not only high retroreflectance but high daytime "whiteness". The whiteness of an object is sometimes described in terms of the second of the tristimulus coordinates (X,Y,Z) for the object, and thus is referred to as "cap-Y". The cap-Y scale ranges from 0 for a perfectly black object to 100 for a perfectly white object. The whiteness of an object is also sometimes described in terms of its "Luminance Factor", ranging from 0 to 1. If the daytime whiteness of cube corner sheeting could be increased, without substantially reducing retroreflectance, such sheeting could find broader application in graphics applications. Cube corner sheetings which have an aluminum or other metal vapor coat applied to the structured surface tend to have a somewhat grayish appearance, rather than white.

One way that the whiteness of cube corner sheeting has been increased in the past is by printing white ink on the sheeting. Such printing methods have included printing on the outside of the transparent overlay layer or printing on the structured surface of the cube layer. Although these methods have helped increase the whiteness of vapor coated cube corner sheeting, they tend to reduce or sacrifice the retroreflectiveness of the sheeting. Accordingly, the art seeks more durable, less expensive, easier to manufacture alternatives while reducing the sacrifice in retroreflectiveness.

SUMMARY

Retroreflective sheeting includes a transparent film, a pigmented layer having pigmented indicia thereon, and a retroreflective cube layer. The cube layer includes a number of cube corner elements bounded by at least two sets of intersecting grooves. A metallic film is disposed on at least some of the cube corner elements. The pigmented layer is interposed between the transparent film and the cube layer, and has pigmented indicia aligned with at least one of the sets of intersecting grooves.

BRIEF DESCRIPTION OF THE DRAWINGS

FIG. 1A is a top perspective view of a sheet of retroreflective material.

DETAILED DESCRIPTION

Figure 1B:
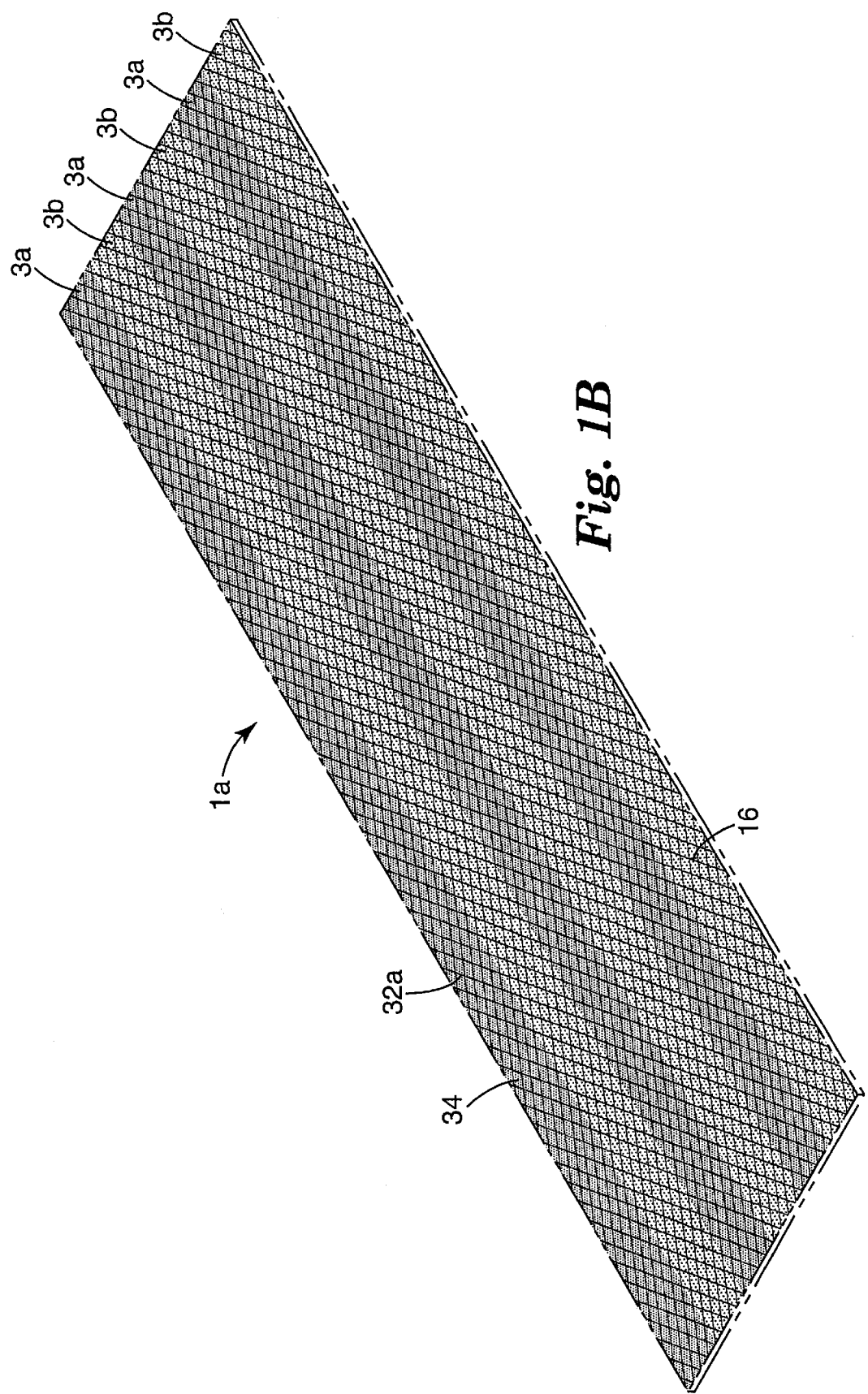
FIG. 1B is a top perspective view of another example of a sheet of retroreflective material.

FIG. 1A is a perspective view of a sheet 1 of retroreflective material having a multiplicity of cube corner elements. Sheet 1 shown in FIG. 1A is suitable for a number of applications including traffic signs, clothing, vehicle markings, and any other applications where increased conspicuity or retroreflection with graphics is desired. Sheet 1 includes an overlay layer 34 (shown in FIG. 5), a retroreflective layer, for example, cube layer 32 that includes viewing surface 33, and a structured surface 35 (shown in FIGS. 3 and 5). The sheet 1 also includes pigmented indicia 16 which appears in the example as intersecting sets of parallel lines. FIG. 1B is another example of a retroreflective material 1a where the cube layer 32a is arranged in multiple orientations and appears as two sets of longitudinal stripes 3a, 3b.

Figures 2, 3:
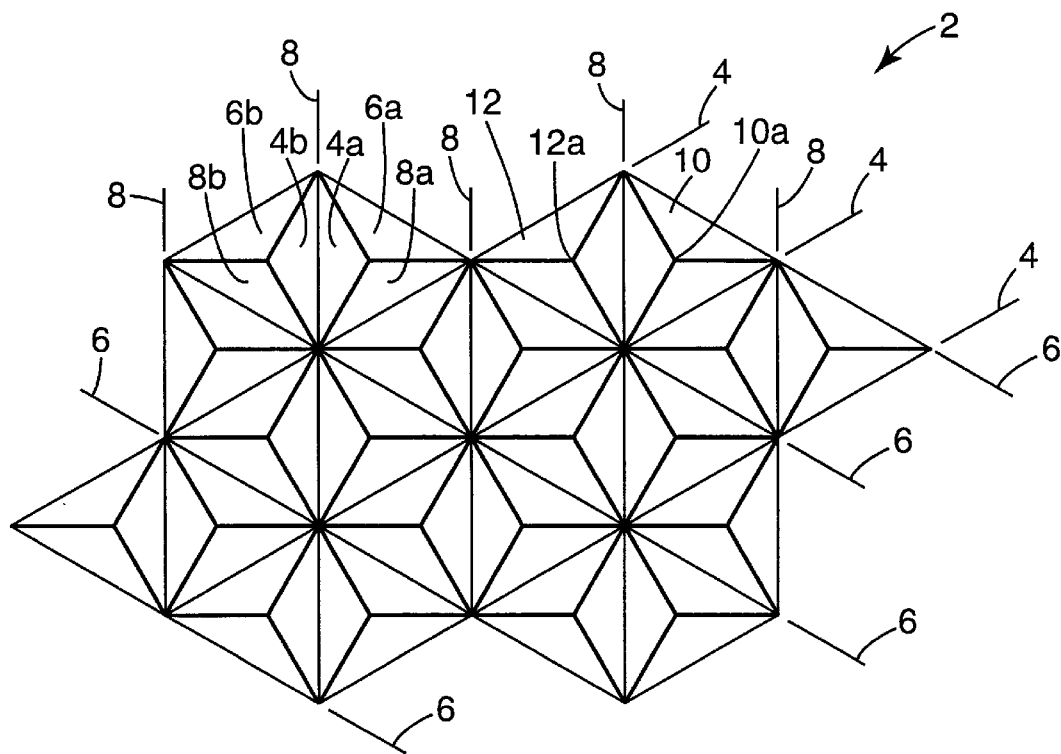
FIG. 2 is a top plan view of a portion of the retroreflective sheet of FIG. 1A.
FIG. 3 is a top plan view of a portion of a retroreflective sheet of FIG. 1A

FIG. 2 shows a magnified plan view of the retroreflective sheeting as seen from viewing surface 33 where the structured surface 35 is visible in detail. Three sets of parallel grooves 4, 6, 8 are formed in the structured surface 35, defining cube corner elements 10 and 12 which each have three faces that converge at apexes 10a, 12a respectively. Apexes 10a, 12a protrude from structured surface 35 and are the rearmost extremities of elements 10, 12, and the "bottom" or "vertex" of grooves 4, 6, 8 (the front-most portion, where opposed groove side surfaces intersect) define triangular-shaped bases of elements 10, 12. The faces of cube corner element 10 comprise mutually perpendicular groove side surfaces 4a, 6a, 8a, and the faces of structure 12 comprise mutually perpendicular groove side surfaces 4b, 6b, 8b. For ease of illustration, only some of the side surfaces of grooves 4, 6, 8 are shown in FIG. 2.

The groove sets intersect each other at about 60 degree included angles. The faces of the cube corner elements are substantially smooth and, when metallized, are characterized by high specular reflectivity and small or negligible diffuse reflectivity. As illustrated, cube corner elements 10 and 12 are bounded by three sets of grooves, 4, 6, and 8. Cube corner elements bounded by two sets of grooves are also known.

FIG. 3 is a top plan view of a portion of a retroreflective sheet. For simplicity, a portion of retroreflective sheet 14 is shown defined by parallel grooves 4, 6, and 8. Although grooves 4, 6, and 8 are shown with angles of about 60 degrees, other suitable angles can be used. Sheet 14 includes pigmented indicia 16 that is shown in the form of two parallel markings 18 that are substantially aligned with grooves 4. Indicia 16 repeats over the remainder of sheet 14 in order to enhance pigmentation for daytime viewing. In one example, indicia 16 is colored white to increase the cap Y value of sheet 14. Indicia 16 can include sets of dots, or other suitable shapes. In the example shown, such features are substantially aligned with at least one set of grooves 4, 6, or 8. By aligning indicia 16 with at least one set of grooves, less retroreflectivity is sacrificed for a given increase in pigmentation. Also, aligning indicia 16 with at least one set of grooves increases the retroreflectivity for a given amount of pigmentation over a unit of surface area. In the example of FIG. 1B, the indicia are aligned with at least one groove of one set of longitudinal stripes, for example stripes 3*a*. It is contemplated that the indicia are aligned with at least one groove of both sets of longitudinal stripes 3*a*, 3*b*.

Figure 4:
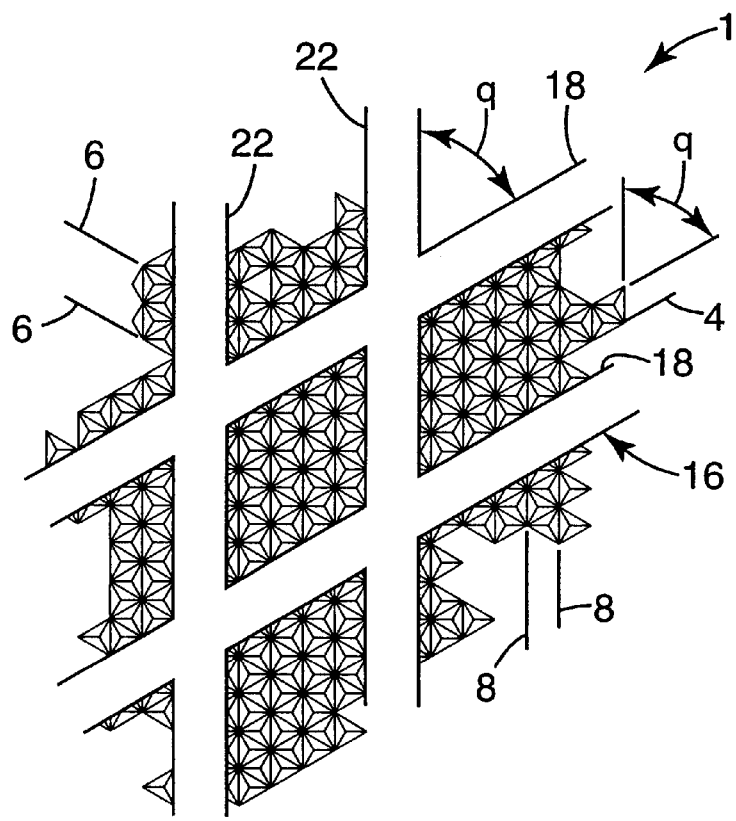
FIG. 4 is a top plan view of a portion of a retroreflective sheet of FIG. 1A.

FIG. 4 is a plan view of a portion of the retroreflective sheet of FIG. 1A. The portion of sheet 1 illustrated in FIG. 4 is similar to that of FIG. 3, except that pigmented indicia 16 comprises two sets of parallel stripes 18, 22, such as that shown in FIGS. IA and 1B. In the embodiment shown in FIG. 4, each set of stripes is still substantially aligned with one of the groove sets 4, 6, 8. For example, stripes 18 are aligned with grooves 4, while stripes 22 are aligned with grooves 8 and extend the length of the sheet 1. Thus, stripes 16 and 18 intersect at an angle, θ (theta), which is substantially the same as the angle of intersection between grooves 4 and 8. Those skilled in the art will appreciate that pigmented indicia 16 may comprise as many sets of stripes as there are sets of grooves. In one example, stripes 16 and 18 have a uniform width ranging between 0.1 mm and about 2.0 mm. Additionally, it is preferred that the pigmented indicia cover a portion of the retroreflective surface ranging from 10% to 80% although other ranges are possible.

Figure 5:
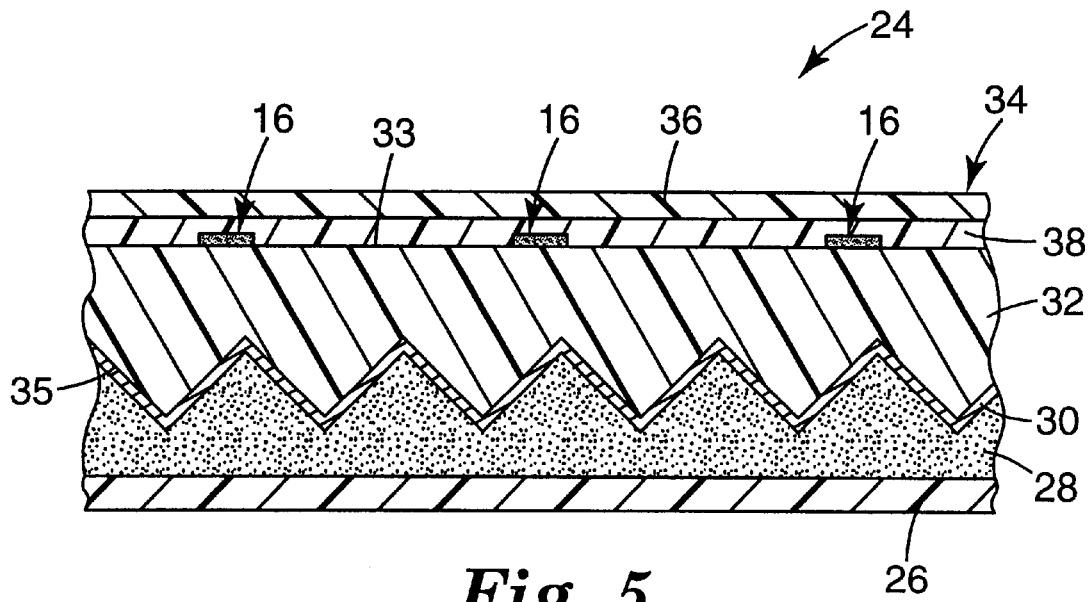
FIG. 5 is cross-sectional elevation view of a retroreflective sheet of FIG. 1A

FIG. 5 is a cross-sectional elevation view of a retroreflective sheet 24 in accordance with an embodiment of the present invention. Sheet 24 includes base layer 26, adhesive layer 28, metallic layer 30, cube layer 32, and overlay layer 34. Preferably, base layer 26 is a liner such as a silicone coated release liner that is bonded to adhesive layer 28. In one example, adhesive layer 28 is a pressure sensitive adhesive, however adhesive layer 28 can be any suitable adhesive. One specific example is tackified acrylic pressure sensitive adhesive. Layer 28 is also adhered to metallic layer 30, which can be preferably a coating of vaporized aluminum that is deposited onto cube layer 32. Use of a suitable primer material such as a titanium metal sputter coated on cube layer 32 has been found to enhance the adhesion of the vapor deposition. As is known, use of a metallic layer, such as layer 30, increases the entrance angularity of cube layer 32.

Cube layer 32 can be any suitable cube layer adapted to reflect light back towards its source, for example, the cube layer can be formed from a polycarbonate. Alternatively, the cubes could be cast from an epoxy acrylate radiation curable resin. In one example, layer 32 includes substantially planar viewing surface 33 and structured surface 35 although other viewing surfaces are contemplated. Layer 32 can also include cube corner elements such as elements 10, 12, of FIG. 2, that are canted with respect to each other such that retroreflectivity is improved over a wider range in incident angles.

Overlay layer 34 includes substantially transparent cover film 36, pigmented layer 38, and pigmented indicia 16. In one example, layer 34 is constructed from layers of polyester and copolyester such as layers of polyethylene terephthalate and co-polyethylene terephthalate (PET/COPET). The term "co-polyethylene terephthalate" ("COPET") refers to a copolymer of polyethylene terephthalate and another monomer such as isophthalate. The overlay 34 is formed by coextruding two resins. Exemplary polyester material includes commonly available from Eastman Chemical Company of Kinsport, Tenn. Exemplary copolyester material is available from Eastman Chemical Company of Kingsport, Tenn. under the brand designations: Spectar Copolyester 14471; Eastar PCTG Copolyester 5445; and Eastar Copolyester GN071. A suitable copolyester material is manufactured by Minnesota Mining and Manufacturing Company (3M) of St. Paul, Minn. and designated "80/20". In this example, layer 34 is a PET/COPET where layer 36 is PET and layer 38 is COPET. Layer 34 may be termed a "bilayer" where layer 34 comprises two layers. As can be seen, pigmented indicia 16 is disposed on a surface of overlay layer 34 that is protected from the elements. The disposition of this pigmented indicia can be accomplished by the use of a rotogravure printing operation. Those skilled in this technology can readily design, cut a gravure cylinder, and print this COPET "bilayer" using this method. Alternatively, the pigmented indicia 16 can be disposed on cube layer 32.

Film 36 is adapted for outside exposure. Thus, film 36 can have resistance to ultraviolet light, water, and impact. Further, film 36 is also suitable for exposure to temperatures ranging from about −30 degrees Celsius to over 60 degrees Celsius. In one example, PET film 36 includes an ultraviolet (UV) stabilizer. For example, layer 36 can include a triazine UV absorber which is characterized by both broad-band UV absorption, peaking between 300–360 nm and low volatility to provide a combination of low color, excellent permanence, high temperature stability and UV stability. One such triazine UV absorber is sold under the brand designation Cyasorb UV-1164 from Cytec Industries in Batavia, Ill. In addition to, or instead of the UV stabilizer, another form of additive can be added to layer 36 to protect it from light. One example, of such an additive is a hindered amine light stabilizer (HALS). One set of HALS compositions are those containing polymeric compounds made of substituted hydroxypiperidines, including the polycondensation product of a hydroxypiperidines with succinic acid or with a triazine. A particular HALS compound is the polycondensation product of 1-(2-hydroxyethyl)-2,2,6,6-tetramethyl-4-hydroxypiperidine with succinic acid. One group of suitable HALS compositions are available commercially, for example, under the trade designation "Tinuvin" (such as "Tinuvin 622") available from Ciba of Tarrytown, N.Y. Additionally, the UV stabilizer and HALS can be used alone or in combination, and can be added to either, or both of the PET layer 36 and COPET layer 38.

Pigmented layer 38 is transparent and includes pigmented indicia 16. Layer 38 can be clear (uncolored) or it can be colored to add visual impact to sheet 24. For example, if sheet 24 will be used as a stop sign, layer 38 can be colored red. Alternatively, layers 36 and 38 can be colored. Also, the cube layer 32 can be colored. Preferably, the inner surface of the overlay is printed a color and covered with pigmented indicia 16. Layer 38 is preferably constructed from COPET and, in the example, is easier to print on than PET. In addition to the rotogravure method described above, the pigmented indicia 16 can be screen printed onto layer 38 in a manner known in the art. In one example, the ink used for indicia is vinyl based with titanium dioxide pigment that is compatible with the COPET layer on which it is printed.

Although layer 34 has been described as a PET/COPET bilayer, layer 34 can also be constructed from other materials such as polymethylmethacrylate (PMMA). In this example, layer 34 is a monolayer. In an additional example, layer 34 is polyurethane. The monolayers can include additives. In the examples with monolayers, pigmented indicia are placed on the monolayer either on the outer surface of layer 34 or on the inner surface between layer 34 and cube layer 32.

Once pigmented indicia 16 is printed upon overlay layer 34, layer 34 is laminated, e.g., heat laminated, or otherwise attached to cube layer 32 to form retroreflective sheet 24. Such lamination can be effected in any suitable manner and is known in the art. Heated lamination is particularly advantageous for retroreflective sheeting with a PET/COPET overlay. When the indicia is printed upon the COPET layer, solvent in the ink can cause some crystallization of the COPET layer, and thus cloud the layer to some extent. Re-heating the crystalline COPET (such as during a heated lamination) can convert it to an amorphous state and thus increase the clarity of the layer. Additionally, the bond between the PET layer and COPET layer can be enhanced when subjected to the heated lamination.

An exemplary retroreflective sheeting, in accordance with the teachings above was prepared as follows. A PMMA overlay film was printed with a vinyl-based ink having a titanium dioxide pigment. The print pattern was a crosshatch that was intentionally designed to align with the grooves of the cube layer. A polycarbonate cube layer was then prepared using standard thermal processing methods. The overlay layer was laminated to the cube layer using standard heat lamination techniques, while ensuring that the printed side of the overlay layer faced the cube layer, thus burying the printed indicia under the overlay. The opposite side of the cube layer was then primed by sputter-coating it with a metal primer such as a titanium. Once the priming was complete, a layer of vaporized aluminum was deposited upon the primed surface. Adhesive was applied to the metallized side of the cube layer to complete the retroreflective sheeting.

In another example, the same process was used, but a PET/COPET bilayer was substituted for the PMMA overlay layer. A PET/COPET bilayer has advantages over PMMA. For example, PET/COPET is typically less expensive than PMMA, and does not require an additional smoothing film when heat laminating the overlay 34 to the cube layer. PET/COPET is also less brittle and thus less prone to fracturing.

Although the present invention has been described with reference to specific embodiments, workers skilled in the art will recognize that changes may be made in form and detail without departing from the spirit and scope of the invention, which are defined by the appended claims.

What is claimed is:
1. A retroreflective cube corner sheeting comprising:
   a cube layer including a viewing surface and a structured surface provided with a plurality of cube corner elements, the cube corner elements being bounded by at least two intersecting sets of parallel grooves, the cube layer also including a metallic film disposed on at least some of the cube corner elements;
   a substantially transparent overlay layer having a front surface and a rear surface coupled to the viewing surface of the cube layer;
   pigmented indicia disposed on the overlay layer; and
   wherein the pigmented indicia is aligned with at least one of the sets of grooves.

2. The sheeting of claim 1, wherein the pigmented indicia is disposed between the rear surface of the overlay layer and the viewing surface of the cube layer.

3. The sheeting of claim 1, wherein at least portions of the overlay layer contact the viewing surface of the cube layer.

4. The sheeting of claim 1, wherein the cube layer comprises a substantially flat film.

5. The sheeting of claim 1, wherein the at least two intersecting sets of parallel grooves consists essentially of three intersecting sets of parallel grooves.

6. The sheeting of claim 1, wherein the pigmented indicia is diffusely reflective.

7. The sheeting of claim 1, wherein the indicia consists essentially of two intersecting sets of parallel stripes.

8. The sheeting of claim 7, wherein each of the intersecting sets of parallel stripes is substantially parallel to one of the sets of parallel grooves.

9. The sheeting of claim 7, wherein two of the sets of intersecting grooves intersect at an angle θ, and two of the sets of parallel stripes also intersect at substantially the angle θ.

10. The sheeting of claim 9, wherein the pigmented indicia is substantially white.

11. The sheeting of claim 7, wherein the stripes have a substantially uniform stripe width.

12. The sheeing of claim 11, wherein the stripe width is from about 0.1 mm to about 2.0 mm.

13. The sheeting of claim 1, wherein the pigmented indicia covers from about 10% to about 80% of the viewing surface of the cube layer.

14. The sheeting of claim 1, wherein the overlay layer includes a transparent film comprising polyethylene terephthalate.

15. The sheeting of claim 1, wherein the overlay layer comprises a PET/COPET bilayer film having a COPET layer in contact with the viewing surface of the cube layer.

16. The sheeting of claim 15, wherein the pigmented indicia is disposed on the COPET layer of the PET/COPET bilayer.

17. The sheeting of claim 15, wherein at least one of the PET layer and the COPET layer of the PET/COPET bilayer includes an ultraviolet stabilizer.

18. The sheeting of claim 17, wherein the ultraviolet stabilizer is a triazine.

19. The sheeting of claim 15, wherein at least one of the PET layer and the COPET layer of the PET/COPET bilayer includes a hindered amine light stabilizer.

20. A method of making a retroreflective cube corner sheeting, comprising;
   applying a pigmented material to an overlay layer in the form of intersecting sets of parallel stripes; and
   laminating the overlay layer to a cube layer such that the pigmented material is sandwiched between the overlay layer and the cube layer.

21. The sheeting of claim 20, wherein two of the sets of intersecting grooves intersect at an angle θ, and two of the sets of parallel stripes also intersect at substantially the angle θ.

22. The sheeting of claim 20, wherein the intersecting sets of parallel stripes consist essentially of two intersecting sets of parallel stripes.

23. A retroreflective sheeting, comprising:

a retroreflective layer;

an overlay disposed on the retroreflective layer, the overlay comprising an inner layer disposed on the retroreflective material and an outer layer disposed on the inner layer;

wherein the inner layer comprises a copolyester film and wherein the outer layer comprises a polyester film.

24. The retroreflective sheeting of claim 23 wherein a copolyester resin is coextruded with a polyester resin to form the overlay.

25. The retroreflective sheeting of claim 23 wherein the copolyester film comprises a copolyethylene terephthalate and the polyester film comprises a polyethylene terephthalate.

26. The retroreflective sheeting of claim 23 wherein at least one of the copolyester film and the polyester film includes a triazine ultraviolet stabilizer.

27. The retroreflective sheeting of claim 26 wherein the triazine ultra violet stabilizer has a broad-band ultraviolet absorbtion peak between 300–360 nm.

28. The retroreflective sheeting of claim 26 wherein at least one of the copolyester film and the polyester film includes a hindered amine light stabilizer.

29. The retroreflective sheeting of claim 28 wherein the hindered amine light stabilizer includes a polymeric compound made of substituted hydroxypiperidines.

30. The retroreflective sheeting of claim 29 wherein the polymeric compound made of substituted hydroxypiperidines includes a polycondensation product of a hydroxypiperidines with one of succinic acid and triazine.

31. The retroreflective sheeting of claim 23 wherein the retroreflective layer includes a cube corner layer having a structured surface opposite a viewing surface, and wherein the copolyester film is disposed on the viewing surface.

32. The retroreflective sheeting of claim 31 wherein the cube corner layer includes a titanium metal disposed on the structured surface.

33. The retroreflective sheeting of claim 23 wherein pigmented indicia are disposed between the copolyester film and the retroreflective layer.

34. The retroreflective sheeting of claim 33 wherein a transparent color layer is disposed between the copolyester film and the retroreflective layer.

35. The retroreflective sheeting of claim 34 wherein the transparent color layer is disposed on the copolyester film and between the copolyester film and the pigmented indicia.

* * * * *

UNITED STATES PATENT AND TRADEMARK OFFICE
CERTIFICATE OF CORRECTION

PATENT NO. : 6,325,515 B1
DATED : December 4, 2001
INVENTOR(S) : Coderre, James C.

It is certified that error appears in the above-identified patent and that said Letters Patent is hereby corrected as shown below:

<u>Column 3,</u>
Line 35, delete "IA" and insert in place thereof -- 1A --.

Signed and Sealed this

Eighteenth Day of March, 2003

JAMES E. ROGAN
*Director of the United States Patent and Trademark Office*